(12) United States Patent
Candelore et al.

(10) Patent No.: US 7,725,911 B2
(45) Date of Patent: *May 25, 2010

(54) METHOD AND SYSTEM TO MAINTAIN RELATIVE STATISTICS FOR CREATING AUTOMATICALLY A LIST OF FAVORITES

(75) Inventors: Brant Candelore, Escondido, CA (US); Zicheng Guo, San Diego, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 417 days.

This patent is subject to a terminal disclaimer.

(21) Appl. No.: 11/856,623

(22) Filed: Sep. 17, 2007

(65) Prior Publication Data
US 2008/0010657 A1 Jan. 10, 2008

Related U.S. Application Data

(63) Continuation of application No. 09/729,811, filed on Dec. 4, 2000, now Pat. No. 7,284,256.

(51) Int. Cl.
*G06F 3/00* (2006.01)
*G06F 13/00* (2006.01)
*H04N 5/445* (2006.01)

(52) U.S. Cl. ......................... 725/46; 725/142

(58) Field of Classification Search ............. 725/14–20, 725/38, 44–47, 50, 134, 142; 348/563, 564, 348/569, 731–732, 906
See application file for complete search history.

(56) References Cited

U.S. PATENT DOCUMENTS

| | | | |
|---|---|---|---|
| 4,045,816 A | 8/1977 | Cave | |
| 5,047,867 A | 9/1991 | Strubbe et al. | |
| 5,323,240 A | 6/1994 | Amano et al. | |
| 5,410,344 A | 4/1995 | Graves et al. | |
| 5,410,367 A | 4/1995 | Zahavi et al. | |
| 5,444,499 A | 8/1995 | Saitoh | |
| 5,534,911 A | 7/1996 | Levitan | |
| 5,550,578 A | 8/1996 | Hoarty et al. | |
| 5,583,576 A | 12/1996 | Perlman et al. | |
| 5,585,865 A | 12/1996 | Amano et al. | |
| 5,635,989 A | 6/1997 | Rothmuller | |

(Continued)

*Primary Examiner*—Jason P Salce
*Assistant Examiner*—Yassin Alata
(74) *Attorney, Agent, or Firm*—Blakely, Sokoloff, Taylor & Zafman LLP (57) ABSTRACT

An apparatus may include a front-end with a tuner to receive television broadcasts, a memory to store statistics, and a processor in communication with the front-end and the memory. The processor detects tuning events and maintains relative statistics on items related to tuning events. The processor eliminates any occurrence of rollover of the count value by adjusting the count value of each of the one or more items relative to each other upon reaching a predetermined value prior to being reset. The processor creates a list of favorites based on the relative statistics in the memory. The processor may transfer the list of favorites to another device or auto-tune the tuner to receive the items that are placed in the list of favorites. A length of time represented by the units of time may be changed to allow greater selectivity of items that are placed in the list of favorites.

25 Claims, 8 Drawing Sheets

U.S. PATENT DOCUMENTS

| | | |
|---|---|---|
| 5,652,613 A | 7/1997 | Lazarus et al. |
| 5,731,844 A | 3/1998 | Rauch et al. |
| 5,758,257 A | 5/1998 | Herz et al. |
| 5,758,259 A | 5/1998 | Lawler |
| 5,798,785 A | 8/1998 | Hendricks et al. |
| 5,801,747 A | 9/1998 | Bedard |
| 5,835,087 A | 11/1998 | Herz et al. |
| 5,861,906 A | 1/1999 | Dunn et al. |
| 5,867,226 A | 2/1999 | Wehmeyer et al. |
| 5,973,682 A | 10/1999 | Saib et al. |
| 6,005,597 A | 12/1999 | Barrett et al. |
| 6,177,931 B1 | 1/2001 | Alexander et al. |
| 6,373,955 B1 | 4/2002 | Hooley |
| 6,425,128 B1 | 7/2002 | Krapf et al. |
| 6,434,747 B1 | 8/2002 | Khoo et al. |
| 6,477,704 B1 | 11/2002 | Cremia |
| 6,530,083 B1 | 3/2003 | Liebenow |
| 6,601,237 B1 | 7/2003 | Ten Kate et al. |
| 6,637,029 B1 | 10/2003 | Maissel et al. |
| 6,647,411 B2 | 11/2003 | Towell et al. |
| 6,813,775 B1 | 11/2004 | Finseth et al. |

| ITEMS | COUNT |           | ITEMS | COUNT |
|-------|-------|-----------|-------|-------|
| A     | 255   |           | A     | 26    |
| B     | 205   |           | B     | 21    |
| C     | 195   |           | C     | 20    |

90% Reduction

METHOD AND SYSTEM TO MAINTAIN RELATIVE STATISTICS FOR CREATING AUTOMATICALLY A LIST OF FAVORITES

CROSS REFERENCE TO RELATED APPLICATIONS

This application is a continuation of application Ser. No. 09/729,811, filed Dec. 4, 2000, now U.S. Pat. No. 7,284,256, which is hereby incorporated by reference in its entirety.

FIELD OF THE INVENTION

The present invention relates generally to television (TV) broadcast systems. More particularly, the present invention relates to the presentation of content choices to a viewer. Specifically, the present invention relates to a method and system to maintain relative statistics for creating automatically a list of favorites.

BACKGROUND OF THE INVENTION

Today, a viewer can access a variety of programs on hundreds of different channels. A number of sources can broadcast programs via airwaves, cable, or by satellite. A common problem associated with having so many available programs and channels is finding a desired program to view. Many viewers simply "channel surf" or view programs sequentially until they find a desirable program. Although some viewers find channel surfing enjoyable, many viewers prefer a more direct method for selecting a program to view.

One method of finding or selecting a program is by using an electronic program guide (EPG). An EPG is an interactive, on-screen graphical user interface (GUI) that provides a number of options for a viewer. For example, a viewer can use a GUI to program the EPG to list channels by channel number, or list programs in alphabetical order, or list channels or programs by category, or list channels or programs by favorites. A disadvantage with such a method is that the viewer must program the EPG to provide the list in a desired manner. That is, the manual process can be quite complex for a viewer who may not be accustomed to all the features of the EPG.

Furthermore, viewers tend to watch the same channels or programs ("favorites"). Current EPGs are difficult for viewers to program manually a list of favorites. For example, a viewer may not be inclined to know all the times and channels of their favorite programs. As such, the viewer would have to navigate through the EPG it to determine the times and channels of their favorite programs. Such a process can be cumbersome and prevent viewers from using the list of favorites feature.

In addition, current TV broadcast systems have limited resources to determine the habits of viewers. For instance, to determine how long or how many times a viewer accesses the same channel or program, the TV broadcast system must maintain extensive statistics. Hence, a limitation of current TV broadcast systems is that they have limited resources to store and maintain such statistics. Consequently, if one statistical count is limited to a fixed size, e.g., a byte, the statistical count will roll over at a maximum count of "255." Thus, the statistical data may become inaccurate after a certain count.

SUMMARY

An apparatus may include a front-end with a tuner to receive television broadcasts, a memory to store statistics, and a processor in communication with the front-end and the memory. The processor detects tuning events and maintains relative statistics on items related to tuning events. The processor eliminates any occurrence of rollover of the count value by adjusting the count value of each of the one or more items relative to each other upon reaching a predetermined value prior to being reset. The processor creates a list of favorites based on the relative statistics in the memory. The processor may transfer the list of favorites to another device or auto-tune the tuner to receive the items that are placed in the list of favorites. A length of time represented by the units of time may be changed to allow greater selectivity of items that are placed in the list of favorites.

Other features and advantages of the present invention will be apparent from the accompanying drawings and from the detailed description that follows below.

BRIEF DESCRIPTION OF THE DRAWINGS

The features and advantages of the present invention are illustrated by way of example and not intended to be limited by the figures of the accompanying drawings, in which like references indicate similar elements and in which.

DETAILED DESCRIPTION

According to the embodiments described herein, a method and system are disclosed in which a tuning event is detected. Relative statistics are maintained on one or more items related to the tuning event. A list of favorites is created automatically based on the maintained relative statistics. By using the relative statistics, ranking of favorites can be maintained efficiently within limited system resources. Furthermore, a viewer can be presented with a selection of favorites based on a number of items without having to program manually the list of favorites.

Figure 1:
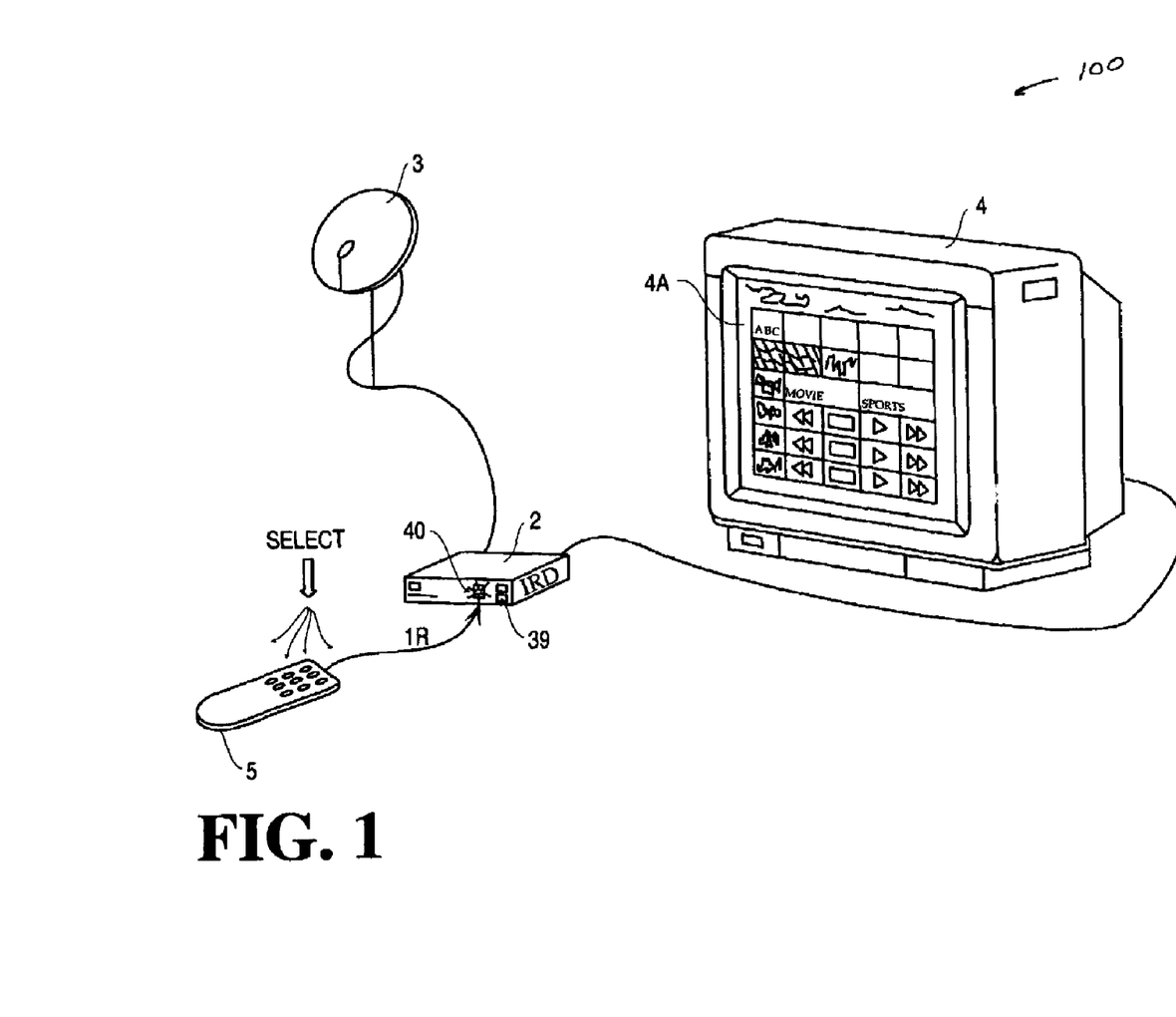
FIG. 1 illustrates an exemplary broadcast system in which the present invention can be implemented.

FIG. 1 illustrates an exemplary broadcast system 100 in which the present invention can be implemented. Referring to FIG. 1, the broadcast system 100 includes an integrated receiver/decoder (IRD) 2, satellite 3, display device 4, and a remote controller 5. The IRD 2 is a receiver (e.g., a set top box) to receive broadcast signals (e.g., television signals) for the display device 4. IRD 2 can receive multiple broadcast signals from a plurality of sources via satellite 3. For example, the satellite 3 can be part of a satellite system such as the DSS™ system. Alternatively, IRD 2 can receive multiple broadcast signals via an antenna or cable system. IRD 2 can also receive analog or digital signals and tune to a designated channel within the signals.

The IRD 2 can also provide on-screen displays (OSDs) to display device 4 such as EPG 4A to assist a viewer in selecting channels. As will be explained in more detail below, IRD 2 can be used to maintain relative statistics on one or more items related to a tuning event (i.e., a selected channel or program). The relative statistics can be used to create automatically a list of favorites, which can be accessed via EPG 4A or a "Favorite" key or button on remote controller 5. Display device 4 can be a television (TV) set receiving analog or digital signals. Remote controller 5 is a control device for a viewer to provide inputs to IRD 2 or display device 4. Remote controller 5 can include alphanumeric keys, options keys, function keys, and other like keys to operate IRD 2 or display device 4. In particular, a viewer can access and navigate through the EPG 4A by pressing selectively certain buttons or keys on remote controller 5.

Figure 2:
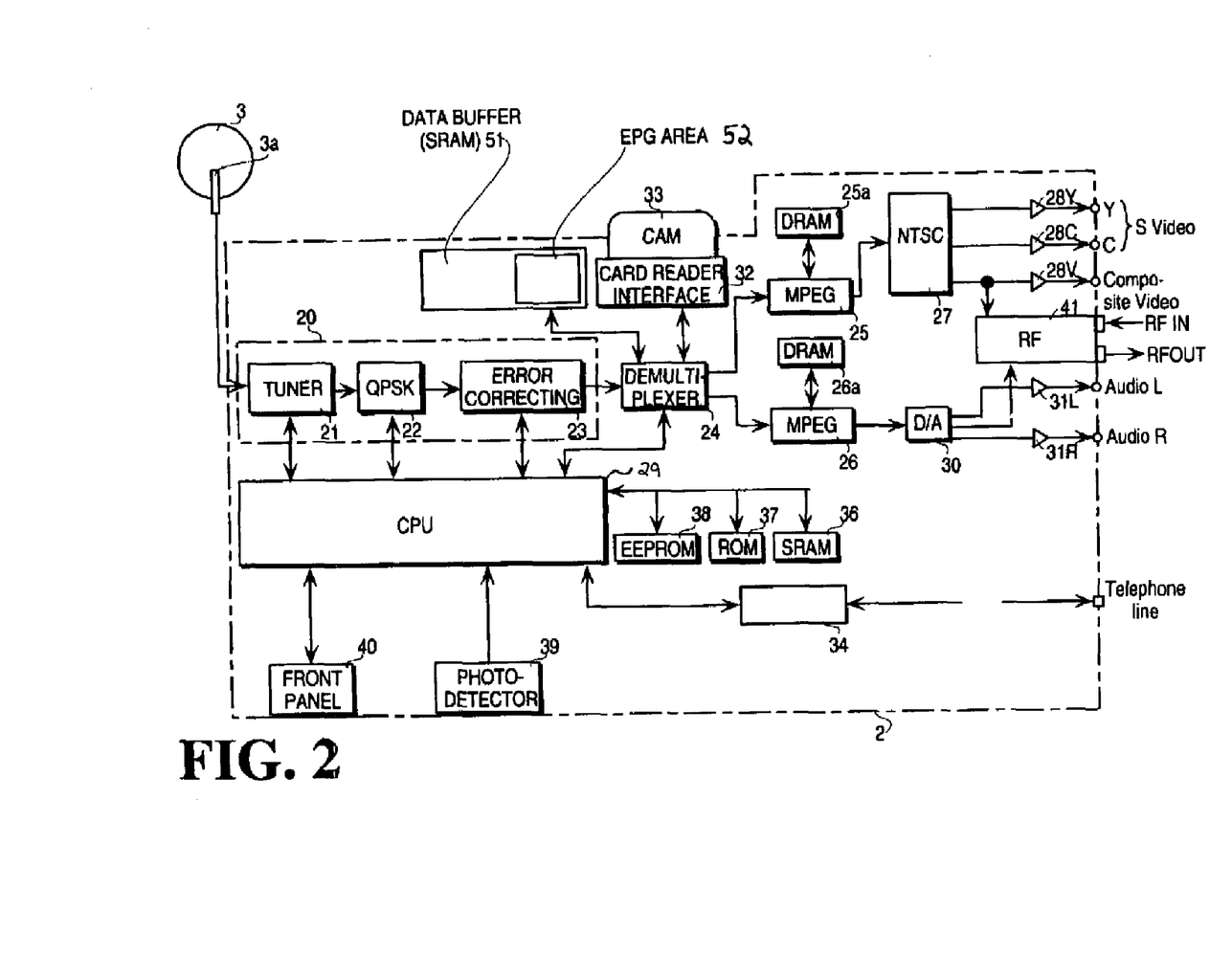
FIG. 2 illustrates a simplified block diagram of a receiver according to one embodiment.

FIG. 2 illustrates a simplified block diagram of a receiver "IRD 2" according to one embodiment. For purposes of explanation, IRD 2 receives digital data. For one embodiment, IRD 2 is a separate component to display device 4. For an alternative embodiment, the components and functionality of the IRD 2 can be placed within display device 4. Referring to FIG. 2, a radio frequency (RF) signal output from the low noise down converter (LNB) 3a of the satellite 3 is supplied to a tuner 21 of a front end 20. The output from the tuner 21 is supplied to a quadrature phase shift keying (QPSK) demodulation circuit 22 for demodulation. The output from the QPSK demodulation circuit 22 is supplied to an error correcting circuit 23 for error correction. For one embodiment, the data is received in encrypted and encoded form and the data can be compressed.

The demultiplexer 24 receives a digital data stream (e.g., stream of data packets) from the error correcting circuit 23 and directs portions of the data stream to appropriate processing components. For one embodiment, the data stream is a digital data stream sent from a satellite. The data stream can include headers for classifying the different portions of the data within the data stream. The demultiplexer 24 can also store the headers in registers and use the headers to direct the data. The data stream can also include video data in the format specified by the Motion Pictures Expert Group standard (MPEG), MPEG audio data, and electronic programming guide (EPG) data.

Data that is identified by its header to be video data is transferred to MPEG video decoder 25. Data that is identified by its header to be audio data is transferred to MPEG audio decoder 26. Similarly, data having a header that identifies the data to be EPG data is transferred to a predetermined area in the data buffer 51 designated to store the EPG. For one embodiment, EPG data can include information that may be useful for statistical analysis, which is used to determine automatically a list of favorites.

The conditional access module (CAM) 33 (e.g., a smart card) can include a processing unit and memory devices such as a read-only memory (ROM) or a random access memory (RAM). The CAM 33 is to be inserted in the card reader interface 32.

The CAM 33 can be used to determine if the viewer has the authorization to receive certain data, e.g., audio/video from a pay TV station, using the authorization information stored in its memory. Thus, if the CAM 33 determines that the user is authorized access, a key to decrypt the incoming data can be provided to the demultiplexer 24. The demultiplexer can use the key to decrypt the data.

The MPEG video decoder 25 decodes the video signal received from demultiplexer 24. The dynamic random access memory (DRAM) 25a that is connected to the MPEG video decoder 25 can be used for buffering and storage of video data during processing by the MPEG video decoder 25. The MPEG video decoder outputs decoded digital video signals to the National Television System Committee (NTSC) encoder 27. The NTSC encoder 27 converts the video signals into a luminance signal (Y) and a chroma signal (C), which are respectively output through a buffer amplifier 28Y or 28C as an S video signal. A composite video signal is also output through a buffer amplifier 28V.

The MPEG audio decoder 26 decodes the digital audio signals. The DRAM 26a that is connected to the MPEG audio decoder 26 can be used for buffering of data and information during processing by the MPEG audio decoder 26. The decoded digital audio signal is converted into an analog audio signal by D/A converter 30. The left audio signal is output through buffer amplifier 31L and the right audio signal is output through buffer amplifier 31R. The RF modulator 41 mixes a composite signal output from the NTSC encoder 27 with an analog audio signal output from the NTSC encoder 27 with an analog audio signal output from the D/A converter 30. The RF modulator 41 converts the mixed signal into an RF signal and outputs the RF signal therefrom.

The central processing unit (CPU) 29 is the central control mechanism for IRD 2. The CPU 29 can execute code stored in the read only memory (ROM) 37, electrically erasable programmable read only memory (EEPROM) 38, or static random access memory (SRAM) 36. Although not shown in FIG. 2, CPU 29 can also access data buffer 51 to access EPG data. For one embodiment, CPU 29 is used to process tuning events from tuner 21 to maintain relative statistics on or more items related to the tuning events and to create automatically a list of favorites using the maintained relative statistics. Furthermore, CPU 29 can be used to process user inputs received from the front panel buttons or switches 40 or from user inputs received via photodetector circuit 39 and remote controller 5. CPU 29 can also be used to program user settings/preferences for broadcast system 100, which can be stored in any of the memory devices of IRD 2.

As will be explained in more detail with the following embodiments, CPU 29 can be used to process and maintain relative statistics, which can be stored in any of the memory devices of IRD 2. CPU 29 can use the relative statistics to rank and generate automatically a list of favorites based on one or more items. For example, a list of favorites can be based on how many times the viewer has tuned into a certain channel. The CPU 29 can also store and maintain counts for the statistics to be relative with other statistics such that limited storage resources are used efficiently.

Figure 3:
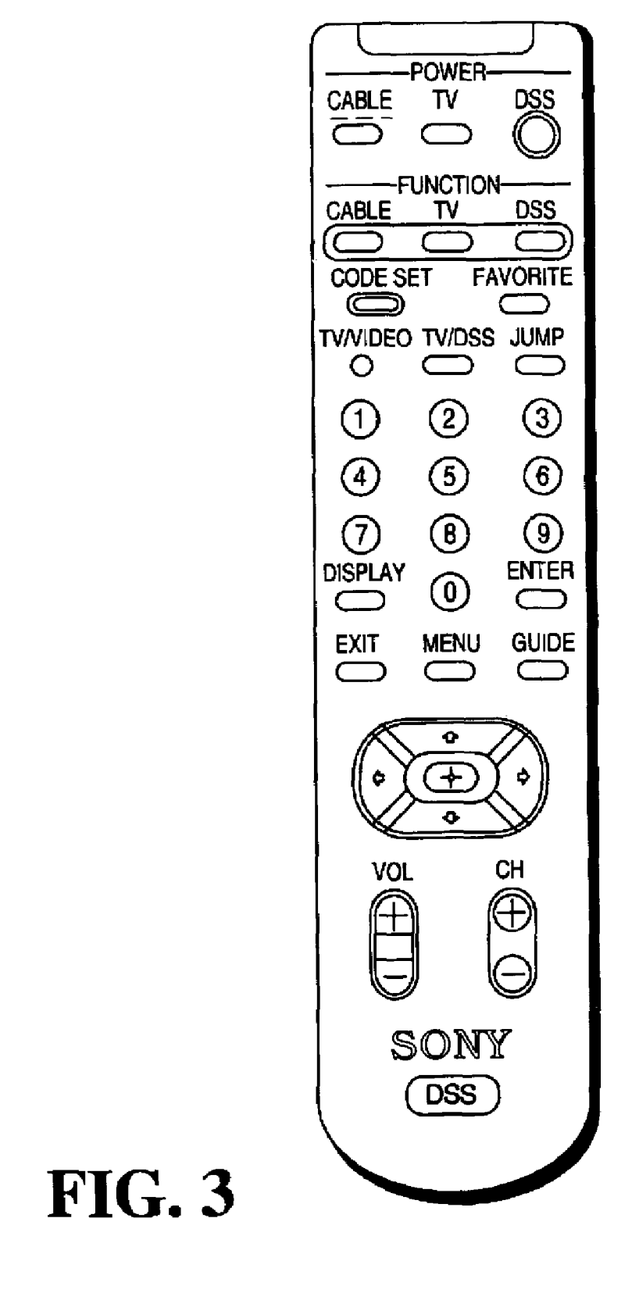
FIG. 3 illustrates a representation of a remote controller according to one embodiment.

FIG. 3 illustrates a representation of a remote controller 5 according to one embodiment. The remote controller allows a viewer/user to transmit commands and make program selections using any number of keys or buttons. The keys or buttons include a direction key for designating a pointer direction such as north, south, east and west, a "GUIDE" key, a "MENU" key, an "EXIT" key, an "ENTER" key, a "FAVORITE" key, a ten-key numeric keypad and other functional keys. A viewer/user can use such keys or buttons to select programs through an EPG having a number of GUIs.

For one embodiment, if a viewer accesses the "FAVORITE" key, a list of favorites based on one or more items can be provided automatically without a viewer having to program the list. For example, the "FAVORITE" key can be used to access a list that ranks favorites based on statistics for one or more items such as, for example, the number times a channel has been accessed. For alternative embodiments, the "FAVORITE" key can be used to change the type of item in which the list is ranking items. For example, a viewer can change the item to be based on programs watched within a six-month period.

Figure 4:
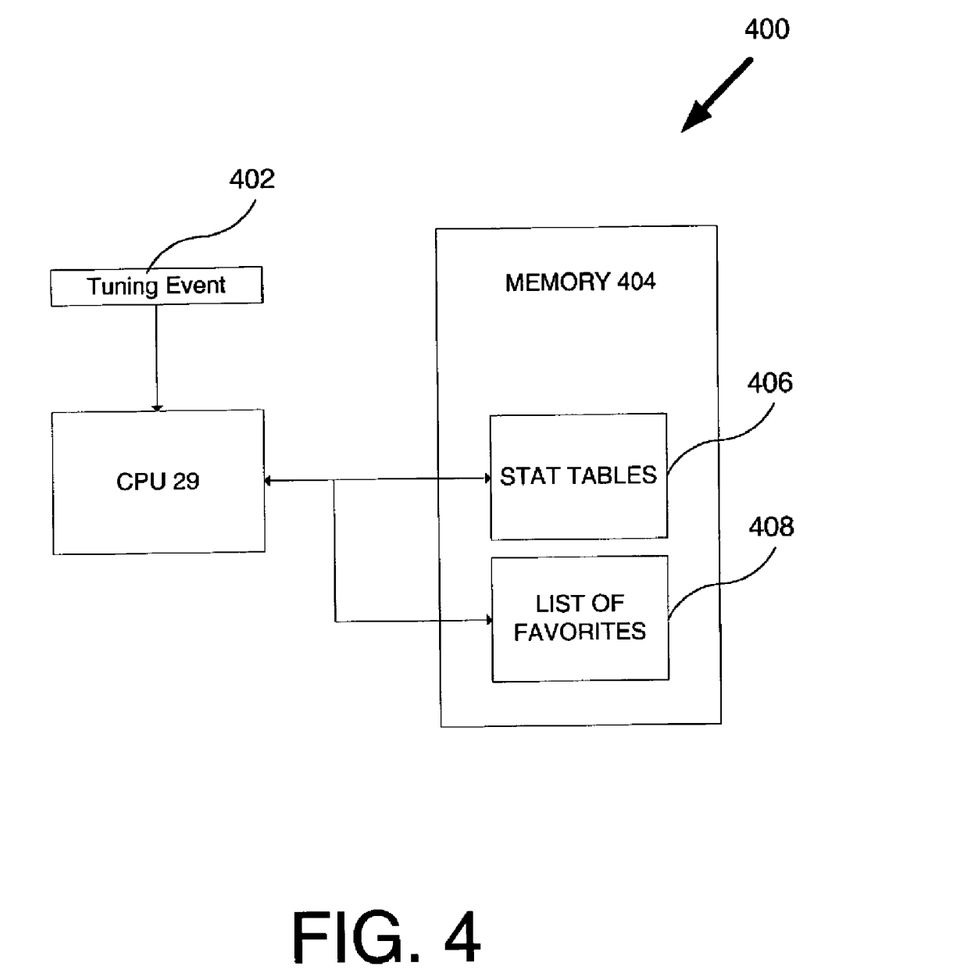
FIG. 4 illustrates a diagram of a system to maintain statistics and a list of favorites according to one embodiment.

FIG. 4 illustrates a diagram of a system 400 to maintain statistics and a list of favorites according to one embodiment. Referring to FIG. 4, system 400 includes a CPU 29, which can detect a tuning event 402. CPU is coupled to memory 404 and operates to maintain statistics ("stat") tables 406 that stores statistics related to the tuning event 402 and a list of favorites 408 based on the stat tables 406.

For one embodiment, CPU 29 detects a tuning event from tuner 21. The tuning event can be based on a selected channel or program. The CPU 29 calculates statistics related to the tuning event 402 and stores the statistics in stat tables 406. The CPU 29 can create a list of favorites 408 using the stat tables 406. Memory 404 can be a memory device within IRD 2. For one embodiment, stat tables 406 and list of favorites 408 are stored in the same memory device. Alternatively, stat tables 406 and list of favorites 408 can be stored in separate memory devices.

Stat tables 406 can be used to store a number of different types of statistics with varying count sizes for storage purposes. For one embodiment, stat tables 406 store statistics using varying sized bytes of storage per channel, program, actor, director, theme, or any other item type in determining a list of favorites. For alternative embodiments, the statistics stored in stat tables 406 can be sent to a remote location via a telephone line, which may be connected to IRD 2. Such information can be valuable in analyzing habits of viewers. The viewer can also control if such information is to be tracked.

As evident in the following exemplary Tables 1 through 4, a long period can be easily tracked.

In exemplary Table 1, items can be tracked for the amount of time an item was viewed for a time interval. For example, items can tracked from varying time intervals (e.g., 5 minute time interval up to a 1 day time interval). Each item can be stored in one byte of memory providing a maximum count of "255." For the 1 day time interval, 6120 hours can be tracked or 255 days or 8.5 months can be tracked.

TABLE 1

Total Time Tracked with 1 Byte of Storage based on Various Units of Time

| | Unit of Time: | | | | | |
|---|---|---|---|---|---|---|
| | 5 Minutes | 10 | 30 | 60 | 6 Hours | 1 Day |
| Time Units Tracked: | 255 | 255 | 255 | 255 | 255 | 255 |
| Hours Tracked: | 21.3 | 42.5 | 127.5 | 256 | 1536 | 6120 |
| Days Tracked: | 0.0 | 1.8 | 5.3 | 10.6 | 64 | 255 |
| Months Tracked: | 0.03 | 0.06 | 0.18 | .36 | 2.13 | 8.5 |

In exemplary Table 2, items can be tracked from varying time intervals (e.g., 5 minute time interval up to a 1 day time interval) in which one and a half bytes of storage can be used. Thus, stat tables 406 can provide a maximum count of "4095" for each item. For the 1 day time interval, 98280 hours or 4095 days, or 136.5 months can be tracked.

TABLE 2

Total Time Tracked with 1.5 Byte of Storage based on Various Units of Time

| | Unit of Time: | | | | | |
|---|---|---|---|---|---|---|
| | 5 Minutes | 10 | 30 | 60 | 6 Hours | 1 Day |
| Time Units Tracked: | 4095 | 4095 | 4095 | 4095 | 4095 | 4095 |
| Hours Tracked: | 341.3 | 682.6 | 2047.5 | 4095 | 24570 | 98280 |
| Days Tracked: | 14.2 | 28.4 | 85.3 | 170.6 | 1023.8 | 4095 |
| Months Tracked: | 0.47 | .94 | 2.84 | 5.68 | 34.13 | 136.5 |

In exemplary Table 3, items can also be tracked from varying time intervals (e.g., 5 minute time interval up to a 1 day time interval) in which one and two bytes of storage can be used. Thus, stat tables 406 can provide a maximum count of "65535" for each item. For the 1 day time interval, 1572840 hours or 65535 days or 2184.5 months can be tracked.

TABLE 3

Total Time Tracked with 2.0 Byte of Storage based on Various Units of Time

| | Unit of Time: | | | | | |
|---|---|---|---|---|---|---|
| | 5 Minutes | 10 | 30 | 60 | 6 Hours | 1 Day |
| Time Units Tracked: | 65535 | 65535 | 65535 | 65535 | 65535 | 65535 |
| Hours Tracked: | 5461.3 | 10922.5 | 32767.5 | 65535 | 393210 | 1572840 |
| Days Tracked: | 227.6 | 455.1 | 1365.3 | 2730.6 | 16383.8 | 65535 |
| Months Tracked: | 7.6 | 15.2 | 45.5 | 91.0 | 546.1 | 2184.5 |

In exemplary Table 4, a number of different types of items are shown in which statistics related to those items can be stored in stat tables 406. Exemplary Table 4 illustrates how the different times can be stored in memory locations of varying sizes.

TABLE 4

Total Memory Bytes for 1, 1.5, 2 bytes of Storage for Various Numbers of Item Tracked

| Items Tracked | # of Items | 1 Bytes | 1.5 Bytes | 2 Bytes |
|---|---|---|---|---|
| Channels | 30 | 30 | 45 | 60 |
| Programs | 60 | 60 | 90 | 120 |
| Actors | 60 | 60 | 90 | 120 |
| Directors | 30 | 30 | 45 | 60 |
| Themes | 20 | 20 | 30 | 40 |
| Award | 20 | 20 | 30 | 40 |
| Year Produced | 20 | 20 | 30 | 40 |

As evident in Tables 1 through 4, the amount of memory needed, e.g., for memory 404, is reasonable even if two bytes of storage were allocated for each tracked item. The list of favorites 408 can rank each item within a particular favorite list. For example, the list of favorites 408 can provide a list of top 15 channels which have the highest count value in stat tables 406. Thus, a user can access EPG 4A to cycle through the list of favorites 408.

Furthermore, channels, programs, actors, directors, themes, awards, and years produced and other items may be tracked in one large list. In addition, each attribute or item may be given different weighting. This may be desirable because it allows more attributes for which to find common criteria to be called a "Favorite" for list of favorites 408. For one embodiment, all attributes are weighed differently. For example, if actors are tracked along with the others criteria, the other criteria may be given a greater weight because the odds of seeing a movie with the same actor is low. Furthermore, directors can direct many movies in which case, directors should be weighed less than actors, but more heavily than channels. Each item may be weighed differently as shown in Table 5.

TABLE 5

|  | Time or # of Times Tuned | Weighting | Score (Used to actually create Favorites List) |
|---|---|---|---|
| Channels | 30 | 1 | 30 |
| Programs | 20 | 6 | 120 |
| Actors | 10 | 5 | 50 |
| Directors | 5 | 5 | 25 |
| Themes | 150 | 2 | 300 |
| Award | 30 | 6 | 180 |
| Year Produced | 2 | 8 | 16 |

If the list of favorites 408 is based on Table 5 above, items based on Themes (having the highest weighted value) would be ranked first in the list of favorites 408.

The following broadcast processing techniques to maintain statistics in stat tables 406 and to create automatically a list of favorites 408 can be implemented by hardware and/or software contained within broadcast system 100. For example, the CPU 29 of IRD 2 can execute code or instructions stored in a machine-readable medium, e.g., memory storage 404, to perform the operations as described herein.

Furthermore, it is an intended advantage that the Unit of Time as shown in Tables 2, 3 and 4 may change over time as the list of favorites matures and the automatic favorites feature is turned on and used. For example, a new set top box recently delivered to a customer might have a Unit of Time of 5 minutes. This would allow the set top box to generate quickly a list of favorites. But as time goes on, the Unit Time can be changed to allow greater selectivity as to the items that succeed in being placed in the list of favorites.

The machine-readable medium to store code or instructions may include a mechanism that provides (i.e., stores and/or transmits) information in a form readable by a machine such a processor, computer, or a digital processing device. For example, a machine-readable medium may include a read only memory (ROM), random access memory (RAM), magnetic disk storage media, optical storage media, or flash memory devices. The code or instructions can be represented by carrier wave signals, infrared signals, digital signals, and by other like signals.

Figure 5:
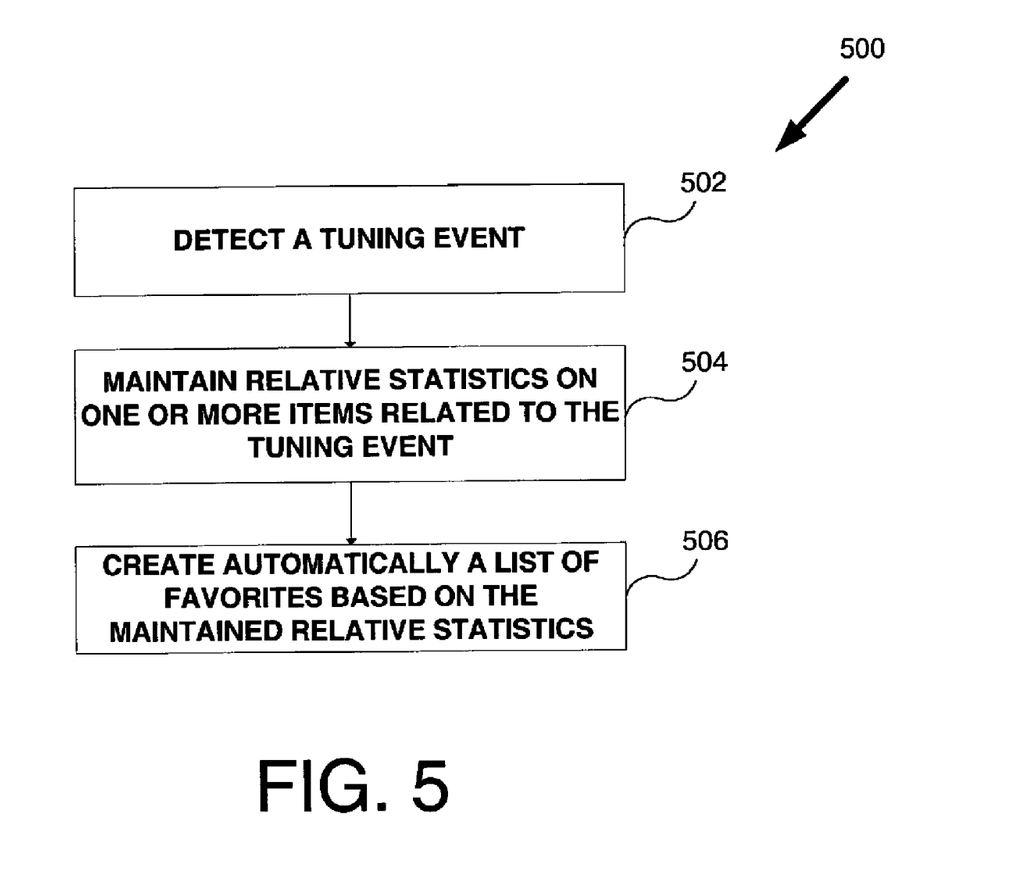
FIG. 5 illustrates a flow chart of an operation to create a list of favorites according to one embodiment.

FIG. 5 illustrates a flow chart of an operation 500 to create a list of favorites according to one embodiment. For purposes of explanation, operation 500 begins at operation 502. Referring to FIG. 5, at operation 502, a tuning event is detected. For example, if a user selects a channel "123," the selection of the channel will trigger the tuning event 402. Alternatively, the program selected by channel "123" will trigger the tuning event 402.

At operation 504, relative statistics on one or more items related to the tuning event are maintained. The types of favorite items that can be tracked are, for example, channels, programs (e.g., series), actors, directors, themes, awards, year produced, or other like types of items. The relative statistics maintained to ascertain favorite status can be based on amount of viewing of a channel, program, actor, director, or theme. Furthermore, the relative statistics can be based on number of times a channel, program, actor, director, or theme was directly key entered, e.g., by entering "123" into the remote controller 5. In addition, the relative statistics can be based on the number of times a channel was tuned in to for over a certain period of time, e.g., 10, 20, or 30 minutes, as shown in Tables 1 through 4 above.

At operation 506, a list of favorites based on the maintained relative statistics is created automatically. For example, the CPU 29 can rank a set number items based on the maintained statistics such that the item with the highest count is listed first and the item with the lowest count is listed last. The CPU 29 can maintain a number of active records in stat tables 406, which accumulate time, e.g., for up to 10 minutes. For example, assuming there are 10 such active records, CPU 29 can start maintain the records. If the 10 records are used, CPU 29 can replace older records with new ones. As 10 minutes are accrued, CPU 29 can add the record the statistics.

For one embodiment, CPU 29 can create list of favorites 408 in real-time or on-the-fly. That is, if a viewer hits the "FAVORITE" key on remote controller 5, the items in the list of favorites 408 will be displayed automatically to the viewer on display device 4.

The list of favorites 408 can be based on the 10 most viewed channels. For instance, the CPU 29 starts with the first 10 channels and sorts them by time and reviews the other channel records. The CPU 28 can replaces the channel with the lowest amount of time with new ones that it finds with more time using statistics stored in stat tables 406.

Figure 6:
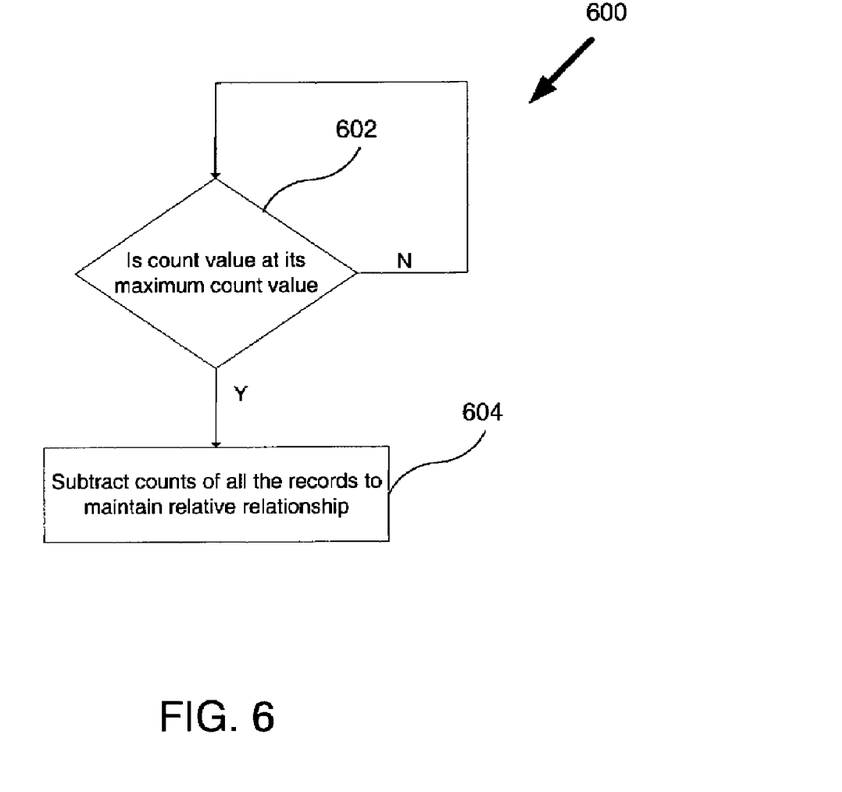
FIG. 6 illustrates a flow chart of an operation to prevent rollover of count values according to one embodiment.

FIG. 6 illustrates a flow chart of an operation 600 to prevent rollover of count values according to one embodiment. Rollover occurs if the count values in memory approach its maximum count value and resets. The operation 600 can prevent rollover by using relative statistics. That is, a certain amount of counts is subtracted from all the count values in the records. Alternatively, a certain percentage of the counts can be subtracted from all the records. As such, broadcast system 100 can allow new channels or programs an opportunity to replace old ones that have been in the list of favorites 408 if viewing habits may have changed.

Referring to FIG. 6, for purposes of explanation, operation 600 is performed for each detected tuning event. At operation 602, CPU 29 determines if a count value for an item in a record is at its maximum count value. For example, if a count value is stored in a three byte location, its maximum count value would be "FF FF FF." If this count value is incremented again, it would reset to "00 00 00." Hence, an item having the most count would have the least amount of counts thus altering the list of favorites.

At operation 604, if the count value is not at its maximum count value, operation 600 continues back to operation 602. At operation 604, if the count value is at its maximum count value, all counts related to items in the record are subtracted by the same amount to maintain relative relationship. Alternatively, a relative percentage can be subtracted from the count values. By performing operation 604, a discontinuity can be prevented from causing an improper list of favorites.

Figure 7:
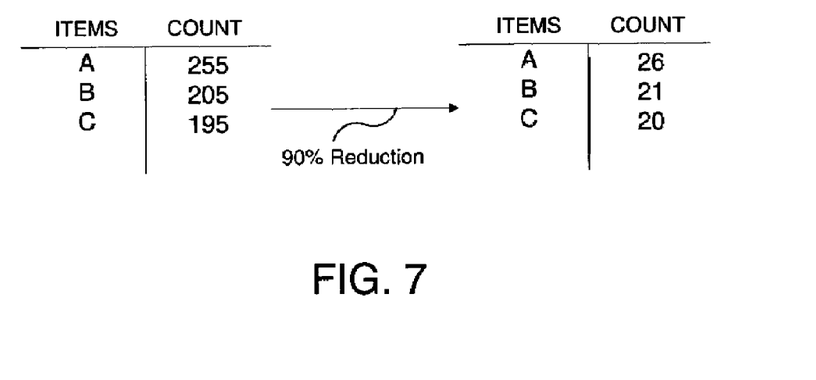
FIG. 7 illustrates relative statistics being maintained according to one embodiment.

For example, as shown in FIG. 7, a record for three items (A, B, C) includes a count value stored in 1 byte of memory. Item A is at its maximum count of "255." Furthermore, item A has a count value that is 50 counts higher than item B and 60 counts higher than item C. Thus, relative statistics can be maintained for all the items by subtracting a certain percentage, e.g., 90%, from the count value of each item. If 90% is subtracted, item A has a new count value of 26, item B has a new count value of 21, and item C has a new count value of 20. In other embodiments, a set amount is subtracted from the count value of each item. As such, the relative rankings will be the same for items A, B, and C. By keeping the new count value for item C non-zero, proper rankings can be maintained since a new item viewed cannot immediately take the place of item C.

Figure 8:
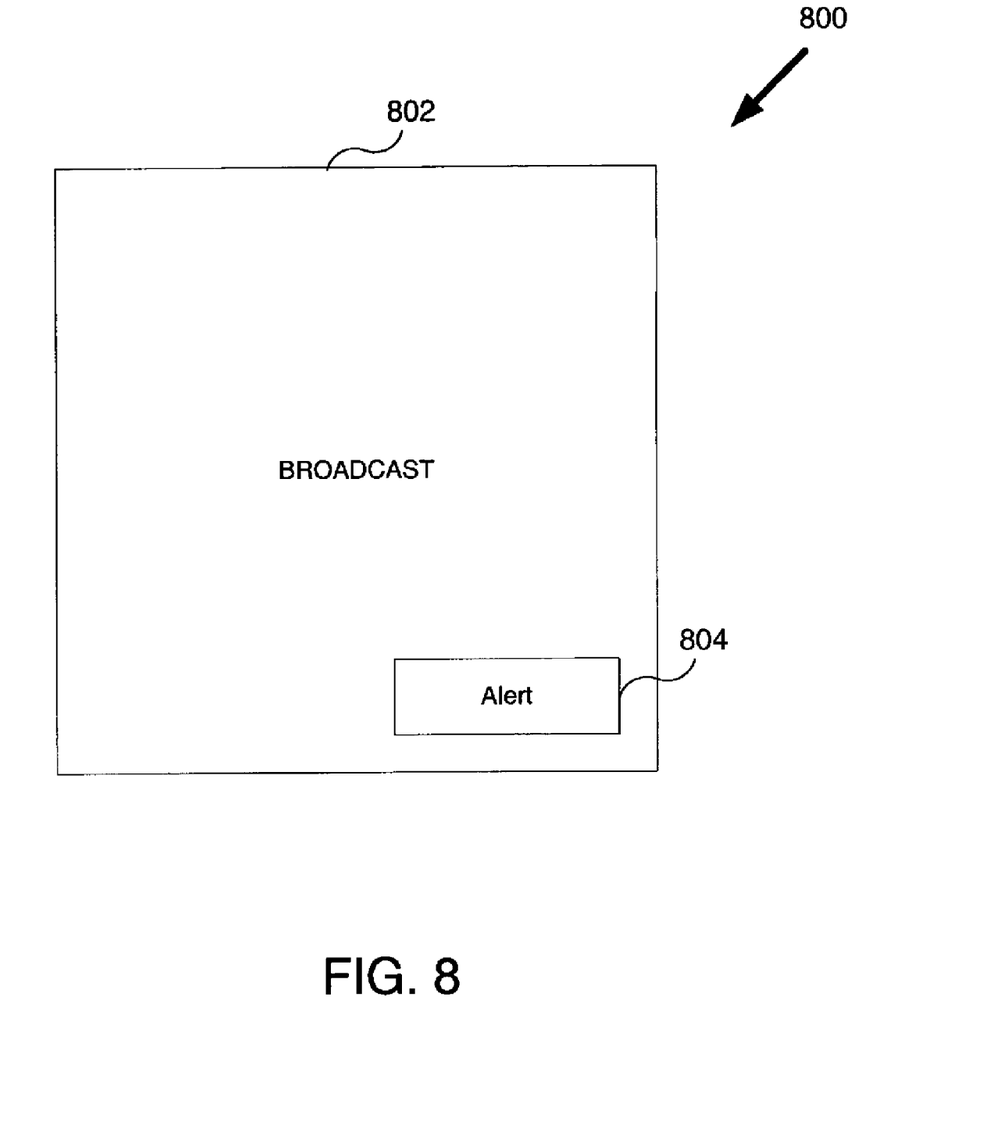
FIG. 8 illustrates a display system providing an alert related to an item in a list of favorites according to one embodiment.

FIG. 8 illustrates a display system 800 providing an alert related to an item in a list of favorites according to one embodiment. Referring to FIG. 8, display system 800 includes a display outputting a broadcast. An alert 804 is provided to a viewer indicating that an item in a list of favorites 408 is about to start or can be viewed. That is, a viewer can be alerted automatically to view a program in the list of favorites 408 that may be playing on another channel.

For one embodiment, alert 804 can be a graphical "marker." For another embodiment, alert 804 appears on display 802 unobtrusively such as, for example, as an asterisk. The viewer can use remote controller 5 to see information related to alert 804 or go directly to the program. Alert 804 can also be a ticker tape shown at the bottom of display 802 to alert the viewer of upcoming programs from the list of favorites 804. For one embodiment, the viewer can double click on the program as it scrolls at the bottom of display 802.

For one embodiment, alert 804 can provide information when one of the program in the list of favorites 408 is starting on another channel if the viewer is not currently watching the correct channel. For another embodiment, alert 804 can provide information when one of the programs in the list of favorites 408 will be starting within, e.g., the next 2 to 3 hours. The alert 804 can be user controllable in which it can be turned on or off.

Figure 9:
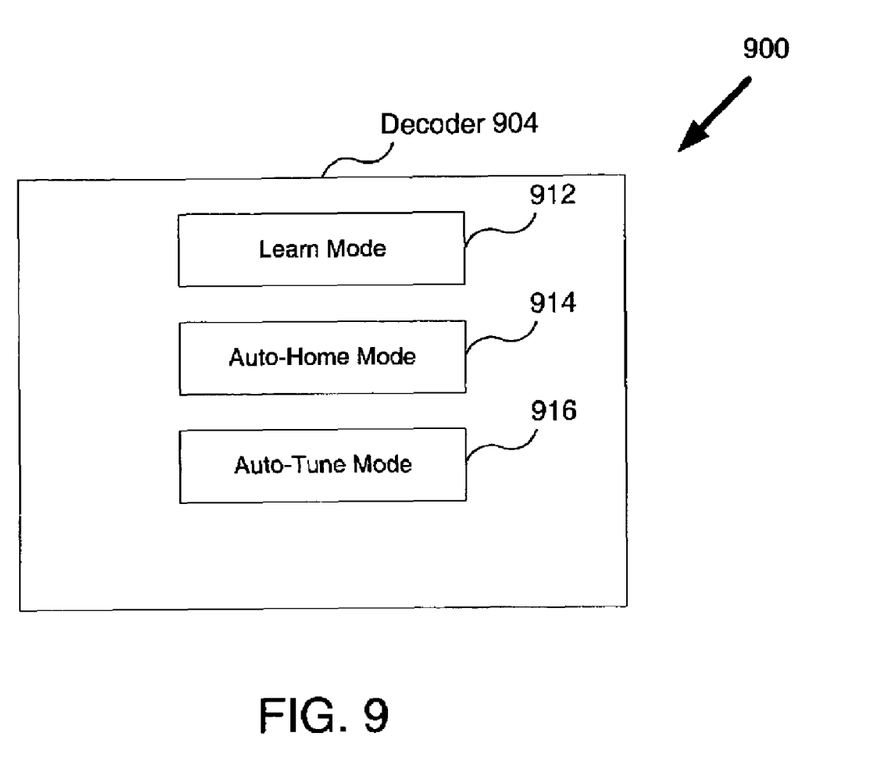
FIG. 9 illustrates a diagram of a decoder that can be programmed to operate in varying modes according to one embodiment.

FIG. 9 illustrates a diagram 900 of a decoder 904 that can be programmed to operate in varying modes according to one embodiment. Referring to FIG. 9, decoder 904 can operate in a learn mode 912, an auto-home mode 914, and an auto-tune mode 916. For one embodiment, decoder 904 can be a receiver such as IRD 2 shown in FIG. 1 that is programmed to operate in modes 912, 914, and 916. In these modes, the list of favorites is a consecutive list of programs that may be auto-tuned without user involvement. This prevents the user from needing to even select a channel or program from the main guide or favorites guide. The channels can be tuned automatically on a daily or weekly basis. For example, a daily pattern may be identified, e.g. that the nightly news is always tuned at a particular time, and this can be added to a auto-tune favorites. Alternatively, the pattern may be on a weekly basis, e.g. that Star Trek Voyager which is on every Monday night on a particular channel is tuned. In that case, there would be a auto-tune favorite for each day of the week. On Mondays, at a particular time, Star Trek Voyager would be auto-tuned.

If in learn mode 912, decoder 904 memorizes programs that are tuned into for a given period of time. If in auto-home mode 914, decoder 904 can automatically switch to channels that contain items in list of favorites 804. In auto-home mode 914, a small icon can be caused to blink on a display. The icon can disappear after a number of seconds or minutes of display. If in auto-tune mode 916, decoder 904 can tune into channels or programs that were learned in learn mode 912. For example, decoder 904 can learn programs viewed by a viewer in a period of week Decoder 904 can be configured to have inputs to select the different modes or be accessed through EPG 4A.

It is an intended advantage to make the list of favorites apply to more than a particular device since there may be a great deal of time and effort invested with a particular list of favorites to make it particularly accurate. For one embodiment, the favorites list may be associated with group viewing, e.g. a family, or even individual members of a group, e.g. the family. The favorites list should be useful not only for set top boxes but any other appliance inside and outside the home such as a Personal Data Assistant (PDA), Digital Wallet, PC, Personal Video Recorder (PVR), and TV. Since the list of favorites may have taken a long time to develop, such transfers of data can save a great deal of time. The list of favorites need not actually be stored on the devices in the consumers possession, rather, it may be stored at a controlling server. In such cases, the consumer can simply identify the devices that should operate on the list of favorites. If the transfers are between devices, then there are many methods that may be employed. Some transfer the data to a controlling server and then to the other device. Other methods, transfer the data on some sort of portable medium, e.g. Sony's Memory Stick, or beaming the data using infrared signals between the devices.

Thus, a method and system to maintain relative statistics for creating automatically a list of favorites have been described. In the foregoing specification, the invention has been described with reference to specific exemplary embodiments thereof. It will, however, be evident that various modifications and changes may be made thereto without departing from broader spirit and scope of the invention as set forth in the appended claims. The specification and drawings are, accordingly, to be regarded in an illustrative sense rather than a restrictive sense.

What is claimed is:

1. An apparatus comprising:
a front-end including a tuner;
a memory to store relative statistics; and
a processor in communication with the front-end and the memory, the processor
to detect a tuning event,
to maintain the relative statistics on one or more items related to tuning events, the relative statistics including a count value of either a number of times or a number of units of time that the item has been tuned to and received by the front-end,
to eliminate any occurrence of rollover of the count value by at least adjusting the count value of each of the one or more items relative to each other upon reaching a predetermined value prior to being reset,
to create a list of favorites based on the relative statistics in the memory, and
to transfer the list of favorites to another device.

2. The apparatus of claim 1, wherein the processor detects the tuning event by detecting a selected channel or program.

3. The apparatus of claim 1, wherein the item includes at least one of a program, a channel number, an actor, a director, a theme, and a category.

4. The apparatus of claim 1, wherein the processor eliminates any occurrence of rollover of the count value by adjusting the relative statistics on the item through one of subtraction of a predetermined value from the count value, subtraction of a predetermined percentage of counts from the count value, and multiplication of the count value by a percentage value less than one and greater than zero.

5. The apparatus of claim 1, wherein the processor creates the list of favorites by:

multiplying the relative statistics on the item by a weighting factor assigned to the item;
multiplying stored relative statistics on other items by a corresponding weighting factor assigned to each item; and
ranking all of the items based on the highest weighted values.

6. A broadcast system comprising:
a display;
a receiver coupled to the display and
to store relative statistics,
to detect a tuning event,
to maintain the relative statistics related to a plurality of items of the tuning event,
to eliminate any occurrence of rollover of a count value by automatically adjusting the count value of each of the plurality of items relative to each other once one of the plurality of items reaches a maximum value so that an order of the plurality of items according to count value remains intact,
to create automatically a list of favorites based on the relative statistics in the memory, and
to transfer the list of favorites to another device.

7. The broadcast system of claim 6, wherein the receiver detects the tuning event by detecting selection of a channel or a program.

8. The broadcast system of claim 6, wherein the plurality of items include at least one of a program item, a channel number item, an actor item, a director item, a theme item, and a category item.

9. The broadcast system of claim 6, wherein the receiver eliminates any occurrence of rollover of the count value by adjusting the relative statistics on the item through one of subtraction of a predetermined value from the count value, subtraction of a predetermined percentage of counts from the count value, and multiplication of the count value by a percentage value less than one and greater than zero.

10. The broadcast system of claim 6, wherein the receiver creates the list of favorites by:
multiplying the relative statistics on the item by a weighting factor assigned to the item;
multiplying stored relative statistics on other items by a corresponding weighting factor assigned to each item; and
ranking all of the items based on the highest weighted values.

11. A method for a broadcast system comprising:
detecting a tuning event,
maintaining the relative statistics on one or more items related to tuning events, the relative statistics including a count value of either a number of times or a number of units of time that the item has been tuned to and received by the front-end,
eliminating any occurrence of rollover of the count value by at least adjusting the count value of each of the one or more items relative to each other upon reaching a predetermined value prior to being reset,
creating a list of favorites based on the relative statistics in the memory, and
transferring the list of favorites to another device.

12. The method of claim 11, wherein detecting the tuning event includes detecting a selected channel or program.

13. The method of claim 11, wherein the item includes at least one of a program, a channel number, an actor, a director, a theme, and a category.

14. The method of claim 11, wherein eliminating any occurrence of rollover of the count value includes adjusting the relative statistics on the item through one of subtraction of a predetermined value from the count value, subtraction of a predetermined percentage of counts from the count value, and multiplication of the count value by a percentage value less than one and greater than zero.

15. The method of claim 11, wherein creating the list of favorites includes:
multiplying the relative statistics on the item by a weighting factor assigned to the item;
multiplying stored relative statistics on other items by a corresponding weighting factor assigned to each item; and
ranking all of the items based on the highest weighted values.

16. An apparatus comprising:
a front-end including a tuner;
a memory to store relative statistics; and
a processor in communication with the front-end and the memory, the processor
to detect a tuning event,
to maintain the relative statistics on one or more items related to tuning events, the relative statistics including a count value of either a number of times or a number of units of time that the item has been tuned to and received by the front-end,
to eliminate any occurrence of rollover of the count value by at least adjusting the count value of each of the one or more items relative to each other upon reaching a predetermined value prior to being reset,
to create a list of favorites based on the relative statistics in the memory, and
to auto-tune the tuner to receive the items that are placed in the list of favorites.

17. The apparatus of claim 16, wherein the processor detects the tuning event by detecting a selected channel or program.

18. The apparatus of claim 16, wherein the item includes at least one of a program, a channel number, an actor, a director, a theme, and a category.

19. The apparatus of claim 16, wherein the processor eliminates any occurrence of rollover of the count value by adjusting the relative statistics on the item through one of subtraction of a predetermined value from the count value, subtraction of a predetermined percentage of counts from the count value, and multiplication of the count value by a percentage value less than one and greater than zero.

20. The apparatus of claim 16, wherein the processor creates the list of favorites by:
multiplying the relative statistics on the item by a weighting factor assigned to the item;
multiplying stored relative statistics on other items by a corresponding weighting factor assigned to each item; and
ranking all of the items based on the highest weighted values.

21. An apparatus comprising:
a front-end including a tuner;
a memory to store relative statistics; and
a processor in communication with the front-end and the memory, the processor
to detect a tuning event,
to maintain the relative statistics on one or more items related to tuning events, the relative statistics including a count value of a number of units of time that the item has been tuned to and received by the front-end,
to eliminate any occurrence of rollover of the count value by at least adjusting the count value of each of the one or more items relative to each other upon reaching a predetermined value prior to being reset, to create a list of favorites based on the relative statistics in the memory, and to change a length of time represented by the units of time and thereby allow greater selectivity as to the items that are placed in the list of favorites.

22. The apparatus of claim 21, wherein the processor detects the tuning event by detecting a selected channel or program.

23. The apparatus of claim 21, wherein the item includes at least one of a program, a channel number, an actor, a director, a theme, and a category.

24. The apparatus of claim 21, wherein the processor eliminates any occurrence of rollover of the count value by adjusting the relative statistics on the item through one of subtraction of a predetermined value from the count value, subtraction of a predetermined percentage of counts from the count value, and multiplication of the count value by a percentage value less than one and greater than zero.

25. The apparatus of claim 21, wherein the processor creates the list of favorites by:
multiplying the relative statistics on the item by a weighting factor assigned to the item;
multiplying stored relative statistics on other items by a corresponding weighting factor assigned to each item; and
ranking all of the items based on the highest weighted values.

* * * * *